United States Patent [19]

Geisinger

[11] Patent Number: 4,966,190

[45] Date of Patent: Oct. 30, 1990

[54] CHECK VALVE FOR A LEAK DETECTOR

[75] Inventor: Penrod C. Geisinger, Dewey, Ariz.

[73] Assignee: Vaporless Manufacturing, Inc., Prescott Valley, Ariz.

[21] Appl. No.: 496,546

[22] Filed: Mar. 20, 1990

[51] Int. Cl.$^5$ .............................................. F16K 31/12
[52] U.S. Cl. .................................... 137/613; 137/459; 137/614.17
[58] Field of Search .................. 137/459, 613, 614.17, 137/614.2, 538, 493.1, 493.6, 493.9

[56] References Cited

U.S. PATENT DOCUMENTS 1,622,069  3/1927  Thomson et al. .................. 137/459
3,621,872  11/1971  Fisher ......................... 137/614.2 X Primary Examiner—John C. Fox
Attorney, Agent, or Firm—Cahill, Sutton & Thomas

[57] ABSTRACT

A check valve for a leak detector used in conjuction with a gasoline dispenser maintains the delivery line under pressure to accelerate translation of the leak detector from the relaxed position through the leak position and to the non leak position unless there is a line leak resulting in flow above a predetermined flow rate. Upon cessation of fuel delivery at the outlet nozzle, the check valve isolates the leak detector from damage due to hydraulic hammer. In the event of leak in the delivery line, the bleed off of pressure locked in by the check valve will permit the leak detector to sense the low pressure when in the leak position and signal the station operator by restricting the flow rate.

18 Claims, 3 Drawing Sheets

CHECK VALVE FOR A LEAK DETECTOR

BACKGROUND OF THE INVENTION

1. Field of the Invention

The present invention relates to check valves and, more particularly, to check valves for use with leak detectors in retail gasoline dispensing systems.

2. Description of the Prior Art

Gasoline dispensers used at automotive service stations dispense gasoline from an underground tank through a nozzle placed in the fill tube of an automobile gas tank. The underground tank includes a pump actuated by a user upon manipulation of a lever at the time of lifting the nozzle from its stored position on the dispenser. Downstream of the pump is a conventional leak detector, which may be of the piston or diaphragm type. For example, a diaphragm leak detector long used since 1976 is known as a Red Jacket Two-Second Model No. 116-017 Leak Detector; a similar unit has been used since 1959. These units are manufactured by the Marley Pump Company. The gasoline line downstream of the leak detector may have a leak which creates an environmental hazard to the adjacent underground and a severe safety hazard to personnel. Such leaks are difficult to detect from the surface of the ground and the leak detector serves the function of precluding delivery of gasoline through the delivery line if a leak of greater than a predetermined rate is present. Trapped air in the delivery line usually does not present a safety hazard but it may have the effect of extending the leak sensing function of the leak detector to the irritation of a user attempting to dispense gasoline. Changes in environmental temperatures may expand or contract the fluid (product) within the delivery line which will vary the pressure in the delivery line and have an effect upon the operation of the leak detector. Upon closing of the dispensing nozzle, a pressure wave rebounds from the dispensing nozzle upstream through the delivery line to the leak detector. This pressure wave, often referred to as hydraulic hammer, subjects the leak detector to potential for severe damage of critical parts, including rupture of the diaphragm in a diaphragm type leak detector. Such damage may be undetected for an extended period of time. If leaks in the delivery line ar present or result from the damaging effects of hydraulic hammer, the damaged leak detector would be incapable of serving the function of detecting such leaks. The resulting environmental and safety hazards would continue unchecked. Hydraulic hammer also causes the leak detector to open prematurely because of the resulting excess pressure down stream of the leak detector. Just turning on the pump, without actuating the nozzle, may cause hydraulic hammer to a detrimental extent.

SUMMARY OF THE INVENTION

A check valve connected to and downstream of a conventional leak detector used in gasoline dispensing systems precludes damage to the leak detector and pump from hydraulic hammer resulting from shut off of the dispensing line nozzle. It also precludes the leak detector from being forced through the leak sense mode to the full run (no leak) mode by preventing the leak detector from mistakenly sensing the rise in pressure generated by hydraulic hammer as equivalent to the rise in pressure achieved in a tight line during the leak sensing mode. During periods of inactivity, a pressure is maintained in the delivery line to permit the leak detector to rapidly advance from the relaxed position through the leak sensing position to the non leak and gasoline dispensing position. In the event of a leak in the delivery line, the check valve will open to permit the leak detector to sense the leak and to reduce dispensation of gasoline. The reduction in dispensation signals the station operator that a potential problem exists.

It is therefore a primary object of the present invention to provide a check valve for protecting a leak detector in a gasoline dispensing system from damage due to hydraulic hammer.

Another object of the present invention is to provide a check valve attached to a leak detector for maintaining pressure in the delivery line of a gasoline dispensation system.

Still another object of the present invention is to provide a check valve secured to a leak detector which interconnects the leak detector in fluid communication with a gasoline dispensing line upon existence of a leak in the dispensing system.

Yet another object of the present invention is to provide an improved flow rate metering device for a leak detector when the leak detector is in the leak sensing position.

A further object of the present invention is to provide an improved seal for a rectilinearly translatable plunger attached to the diaphragm of a leak detector for a gasoline dispensing system.

A still further object of the present invention is to provide an improved diaphragm for a leak detector of a gasoline dispensing system.

A still further object of the present invention is to provide a check valve for removing the effects of excessive head pressure on a leak detector.

A yet further object of the present invention is to provide a method for protecting a leak detector against hydraulic hammer.

These and other objects of the present invention will become apparent to those skilled in the art as the description thereof proceeds.

BRIEF DESCRIPTION OF THE DRAWINGS

The present invention will be described with greater clarity and specificity with reference to the following drawings, in which.

DESCRIPTION OF THE PREFERRED EMBODIMENT

Figures 1A, 2:
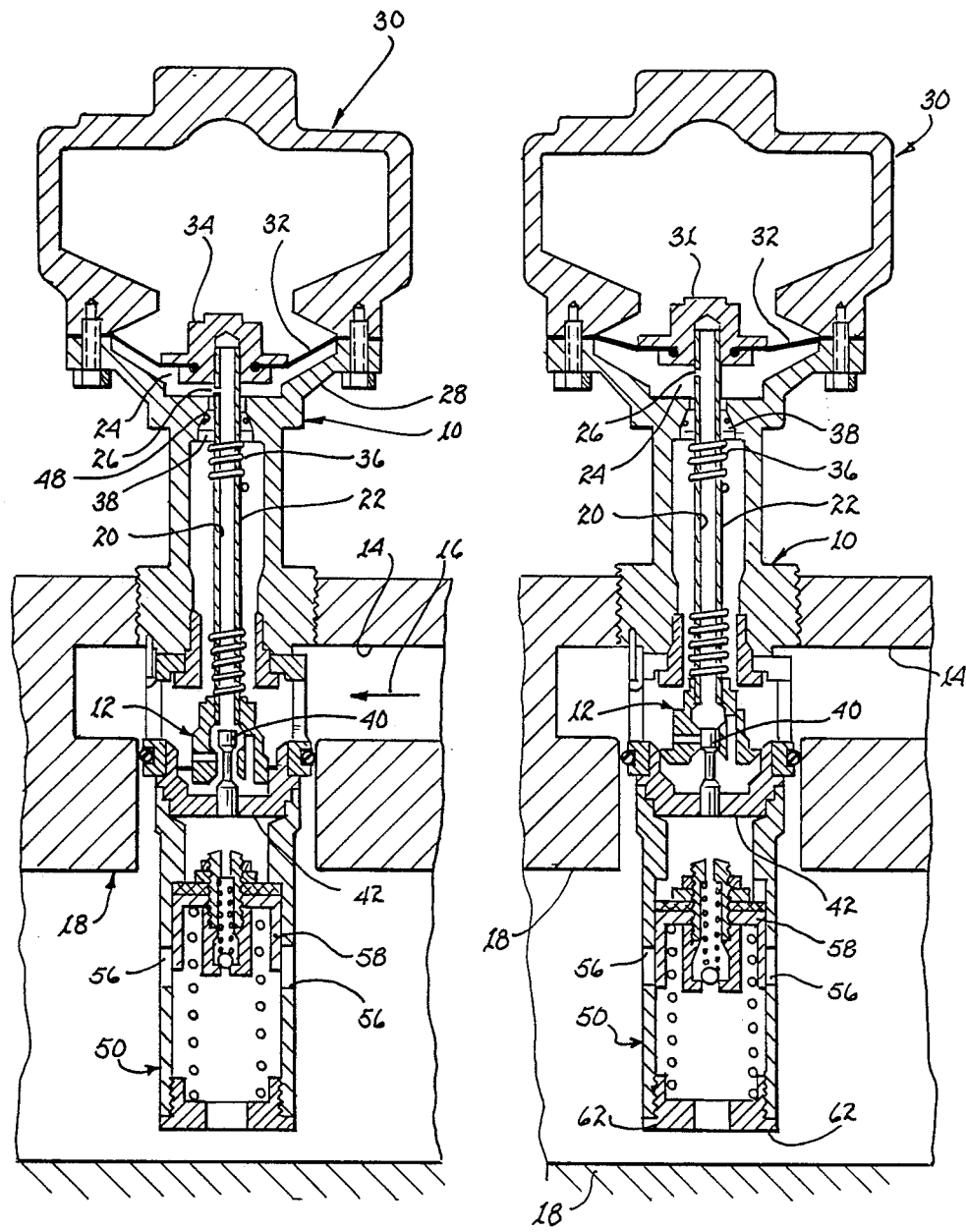
FIG. 1A is a cross sectional view of a check valve secured to a diaphragm leak detector in the relaxed position.
FIG. 2 is a cross sectional view of the check valve and illustrating an attached diaphragm leak detector in the leak sensing position.

Referring to FIG. 1A, there is illustrated a leak detector 10 of the type that has been manufactured for a period of years; this type of leak detector is an industry standard and is used in conjunction with tens of thousands of gasoline storage tank and delivery systems at retail service stations. It has essentially three modes of operation. In the relaxed position, illustrated in FIG. 1A, the pressure in a downstream filled delivery line is approximately 1 psi or less. In this position, a restricted flow rate can occur through poppet 12 in response to a pressure increase in outlet conduit 14, as depicted by arrow 16, from a pump associated with a gasoline storage tank (not illustrated).

Upon actuation of the pump, flow through poppet 12 into the delivery line, representatively referenced by numeral 18, will rapidly increase the pressure within the delivery line to about 8 to 10 psi. Simultaneously, gasoline will flow upwardly through passageway 20 in hollow plunger 22. The flow from passageway 20 will be exhausted into a chamber 24 through an outlet 26 in plunger 22. The chamber is defined by lower part 28 of housing 30 of the leak detector and a diaphragm 32 secured to plunger 22 via a cap 34 at the upper end of the plunger. The gasoline flow into chamber 24 will increase the pressure within the chamber and cause diaphragm or piston disk 32 to flex upwardly. Such upward flexure is resisted by a coil spring 36 disposed about plunger 22 and extending from poppet 12 to a conical seal 38 engaging lower part 28 of the housing. The upward movement of the diaphragm or piston disk will draw plunger 22 upwardly and poppet 12 will rise relative to metering pin 40. In the raised position, the flow through poppet 12 into delivery line 18 and passageway 20 is severely restricted to a gallon per hour rate, which is at or below the legally established or environmentally acceptable rate at a pressure legally established or environmentally acceptable. This state of the leak detector is illustrated in FIG. 2. In the event of a leak in delivery line 18 greater than 3 gph, a further pressure buildup within chamber 24 will not occur and further upward flexure of diaphragm 32 is precluded. Without such further upward flexure of the diaphragm, the metering pin will remain located with respect to the poppet valve to preclude flow through the leak detector at a rate greater than 3 gph.

Figure 3:
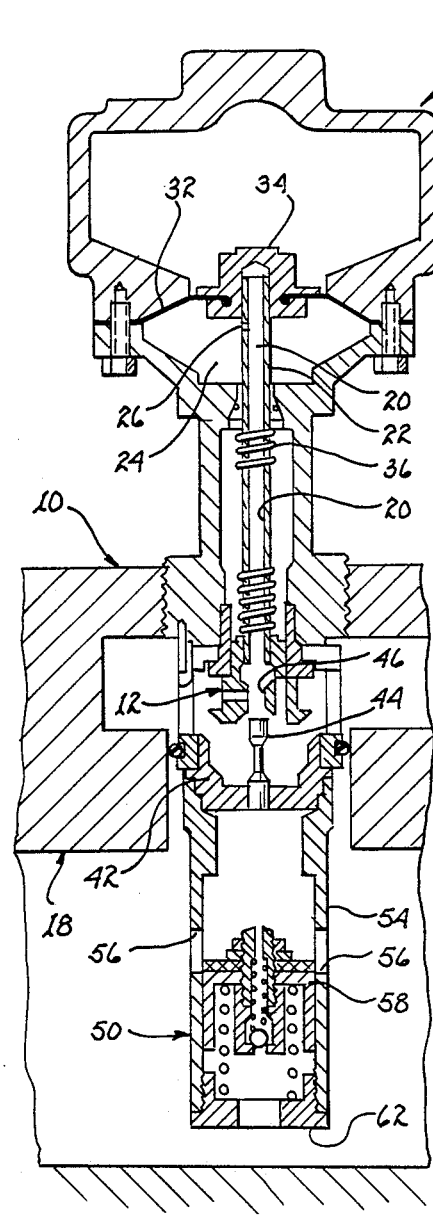
FIG. 3 is a cross sectional view of a check valve attached to a diaphragm leak detector in the non leak position.

In the event that no leak or a leak less than the established threshold exists in the delivery line, pressure will continue to build up within chamber 24 and diaphragm 32 will be flexed upwardly. Such upward flexure, translated through cap 34, will further raise plunger 22 to effectively disengage poppet 12 from metering pin 40. Thereafter, leak detector 10 will no longer restrict flow from conduit 14 connected to the pump and into delivery line 18. This state of the leak detector is illustrated in FIG. 3.

During dispensation of gasoline through the dispenser (gas pump) and its attached nozzle, a substantial pressure and flow rate exists within delivery line 18. Upon termination of flow through the nozzle, a rebound pressure wave(s) is created which travels upstream through the delivery line. This pressure wave has been recorded as having a short term pressure of over 100 psi at the location of the leak detector. Such pressure increase, even though short term, can have a very damaging effect upon the components of the leak detector and the pump. To the extent secondary waves also exist, further damage often occurs. This upstream traveling pressure wave is generally referred to as "hydraulic hammer".

The function of a leak detector is, as stated above, to reduce flow through the delivery line in the event a leak rate above the established threshold exists. The normal time between energization of the pump at the storage tank and full flow through the nozzle is measured in terms of seconds, usually two seconds. This time period may be increased or decreased to some extent depending upon the extent of line resiliency, air pockets or air bubbles in the delivery line, contraction or expansion of the product within the delivery line due to temperature changes and various less significant aberrations.

As a practical matter, the operator of a service station does not pay a great deal of attention to any decreases or even slight increases in the initial delay of gasoline flow through the nozzle provided that approximately the normal flow rate does exist. Accordingly, a damaged leak detector, incapable of sensing the required 3 gph leak, may be defective and detection of this defect may not occur until the next periodic mandatory inspection and testing of the leak detector. In the meantime, substantial leakage of gasoline may be occurring and create substantial environmental and safety hazards. The most usual defects which occur in a diaphragm leak detector relate to a gradual weakening of the diaphragm as a result of flexing and aging. The presence of hydraulic hammer may burst even a brand new diaphragm of the type used for many years; very often hydraulic hammer will burst a weakened diaphragm. The substantial pressures created by hydraulic hammer may cause damage to the metering pin and associated passageways which prevents restricted metered gasoline flow during the leak sensing position of the leak detector. Various seals associated with and formed as part of the leak detector may be damaged or destroyed by hydraulic hammer to render the leak detector inoperable for its intended purpose. Hydraulic hammer can also occur at the time the pump is actuated. The leak detector will, in that time frame, interpret the hydraulic hammer as a pressure build in the delivery line during the leak sense mode and cause the leak detector to change to the full flow mode. In one recent (1989) known instance, hydraulic hammer ruptured the integrity of a piston leak detector which resulted in release of a large number of gallons of gasoline into the environment.

Figure 1B:
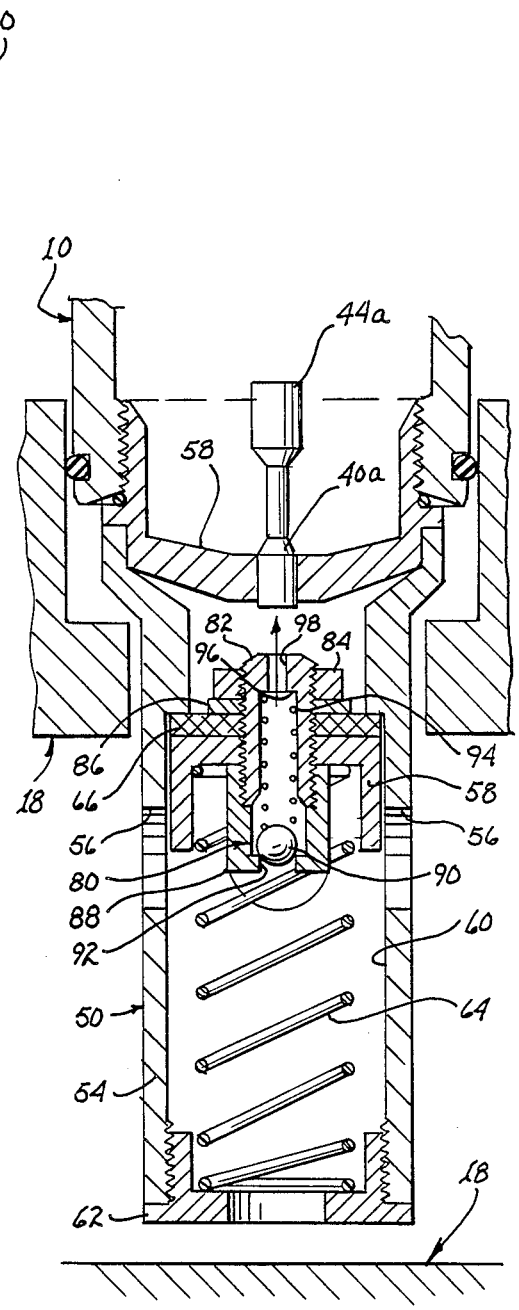
FIG. 1B is a cross sectional view of the components of the check valve.

Referring primarily to FIG. 1B and with joint reference to FIGS. 1A, 2 and 3, a check valve 50 for isolating leak detector 10 from damage due to hydraulic hammer will be described. The downstream end of a conventional diaphragm leak detector includes a spider like element 42 having three arms extending radially from a hub supporting a metering pin 40. Flow into delivery line 18 occurs through the spaces defined between the arms. Check valve 50 may be directly threadedly attached to (or made a part of) element 42, as depicted in FIGS. 1A, 2 and 3 or, preferably, a substitute element 52, as illustrated in FIG. 1B is employed in combination with check valve 50.

The check valve includes a cylindrical skirt 54 extending downwardly from element 52 (or 42). A plurality of apertures 56 are disposed in skirt 54 for fluid communication with delivery line 18. A piston 58 is translatable longitudinally within cylinder 60 defined by skirt 54. An apertured base 62 is disposed at the lower end of skirt 54 to support a coil spring 64. The coil spring extends upwardly into and within piston 58 to urge the piston upwardly. A gasket 66 is disposed about the upper perimeter of piston 58 and bears against annular shoulder 68 of skirt 54 to provide a seal therebetween. Upon downward translation of piston 58, fluid can flow from within skirt 54 above piston 58 through apertures 56 into the delivery line. When the piston is in its raised position, as shown in FIG. 1B, fluid in and about element 52 and the upper end of skirt 54 is precluded from flow into delivery line 18 by the seal between gasket 66 and shoulder 68.

Piston 58 includes a relief valve 80. The relief valve is formed by a hollow threaded stud 82 extending through piston 58. The stud is secured in place by a threadedly engaging nut 84 bearing against a washer or seal 86 adjacent the head of the piston. An apertured end cap 88 threadedly engages the lower end of hollow threaded stud 82; the end cap is drawn up against the underside of the head of piston 58. A ball 90 is disposed within end cap 88 to form a seal with the edge of circular aperture 92 in response to a downward bias exerted by coil spring 94 disposed within the hollow threaded stud. A shoulder 96 within the hollow threaded stud provides support for the coil spring. Upon upward displacement of ball 90, fluid will flow upwardly through the hollow threaded stud and exhaust via passageway 98.

The operation of check valve 50 will be described with joint reference to FIGS. 1A, 1B, 2 and 3. During delivery of gasoline, a predetermined pressure will be present within delivery line 18. This pressure, downstream of check valve 50, will be less than that present in conduit 14 upstream of the check valve. Accordingly, the pressure differential across piston 58 will cause the piston to translate downwardly against the bias provided by coil spring 64 until the top of the piston permits fluid flow through apertures 56. Flow of gasoline will therefore continue from conduit 14, through element 42 (52), past the upper end of skirt 54, through apertures 56 and into delivery line 18. When the nozzle at the downstream end of the delivery line is closed, the pressures on opposed sides of piston 58 will equalize. In response to urging of coil spring 64, the piston will be raised past apertures 56 to prevent reverse flow through apertures in skirt 54. Shortly thereafter, hydraulic hammer, traveling upstream from the nozzle, will strike the check valve. Because piston 58 precludes fluid communication between the delivery line and leak detector 10, the hydraulic hammer will not reach the leak detector. Accordingly, damage to the leak detector from hydraulic hammer will be precluded. It is to be understood that the movement of the piston will, in itself, transmit a small amount of energy into the leak detector cavity.

Upon initiation of delivery, by turning on the dispenser and starting the pump in the gasoline storage tank, pressure in conduit 14 will build. Because of check valve 50, delivery line 18 will be under a greater pressure than that of a delivery system without a check valve. Nominally, the pressure may be 8 to 10 psi and more, but could be less under extreme conditions of thermal contractions. This back pressure will immediately be sensed by the leak detector and gasoline will flow upwardly through plunger 22 into chamber 24. The flow into chamber 24 will raise diaphragm 32 resulting in raising of cap 34 and upward translation of the plunger. Since the pressure will continue to build despite the small flow rate set by the metering pin and due to the preexisting back pressure, flow will continue into chamber 24 until the diaphragm is in its upper position (see FIG. 3). In this position, plunger 22 has been raised to its topmost position and restriction of fluid flow from conduit 14 into check valve 50 has been withdrawn. The increase in pressure on the top of piston 58 will cause the piston to translate downwardly until flow can exhaust through apertures 56 into delivery line 18.

Because of the preexisting pressure within the delivery line, expansion or contraction of the delivery line due to change in temperature of product will not have a modifying effect upon the response of the leak detector. Similarly, any air bubbles or air pockets within the delivery line will be already in a compressed state and will have minimal effect upon the rapidity of operation of the leak detector. Normally, flow of product through the leak detector during the leak sense mode is necessary to compensate for the shrinkage in the volume of product due to thermal contraction. Through use of the check valve, adequate pressure is maintained in the delivery line downstream to compensate for thermal contraction. The interrelationships between pressure, temperature and volume are a function of the delivery line resiliency.

In the event the delivery line has a leak, pressure in the delivery line will dissipate. Upon actuation of the pump, the pressure upstream of check valve 50 will be greater than the pressure in the delivery line. This change in pressure or pressure differential will cause the check valve to translate downwardly and the leak detector will be in fluid communication with the delivery line. The leak detector will now function in its normal mode irrespective of the presence of check valve 50. Accordingly, the leak detector will sense the leak and it will remain in the leak sensing position for larger than two (2) seconds or indefinitely, depending on the size of the leak (see FIG. 2). Accordingly, check valve 50 will not affect the normal operation of the leak detector in the event of a leak in the delivery line.

Preexisting leak detectors 10 have an apertured cone shaped hard polymer seal extending about plunger 22 for sealing engagement with a correspondingly cone shaped passageway going into chamber 24 of housing 30. The seal between the plunger and the cone shaped seal is a metal to hard polymer seal, subject to abrasion and leakage. Thus, leakage into and out of chamber 24 between the plunger and the cone shaped seal becomes a problem due to poor seat or seal and due to wear. The greater the leak, the less accurate is the leak detector and the less reliable is its operation.

Figure 4:
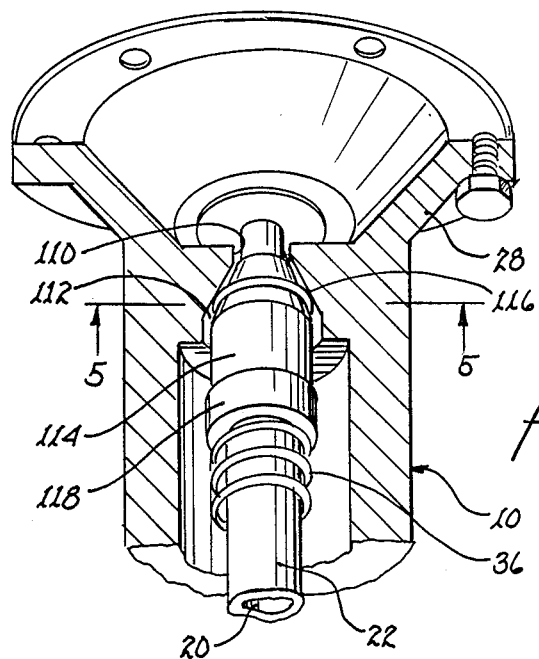
FIG. 4 is a partial cross sectional view illustrating a seal for the plunger secured to the diaphragm of the leak detector.
Figure 5:
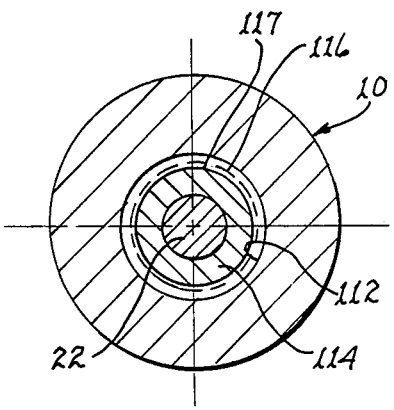
FIG. 5 is a cross sectional view taken along lines 5—5, as shown in FIG. 4.
Figure 6:
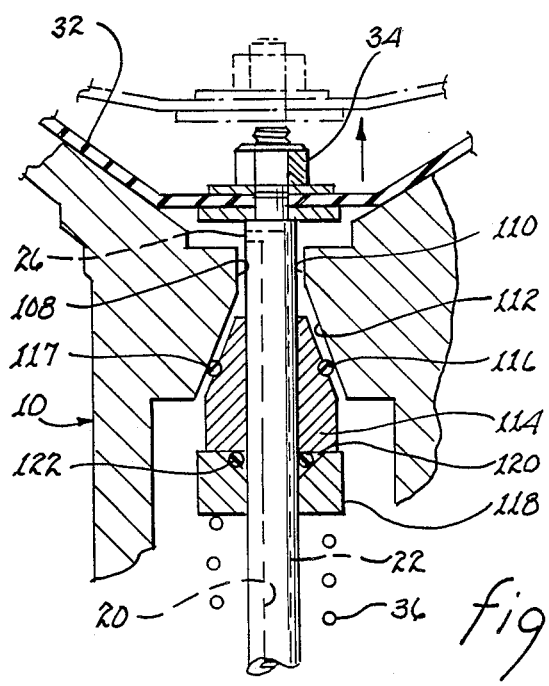
FIG. 6 is a partial detailed cross sectional view of the seal attendant the plunger.

To overcome this long known leakage problem, the sealing elements illustrated in FIGS. 4, 5 and 6 have been developed. A conventional diaphragm leak detector 10 includes a bore 108 for accommodating rectilinear translation of plunger 32. The bore includes a constant diameter section 110 and a downwardly expanding cone shaped section 112. A hollow cone shaped plug 114 penetrably receives plunger 22. It supports an O ring 116 disposed within a suitably formed annular groove 117 to provide a seal between it and cone shaped section 112. A collar 118 is disposed about plunger 22 and bears upwardly against plug 114. The upper inner circumference of the collar is beveled by bevel 120. An O ring 122 is lodged about plunger 22 and against bevel 120. Upon upward urging of collar 118 in response to the force exerted by coil spring 36, O ring 122 will be compressed against the surface of the plunger to establish a seal therebetween, against bevel 120 and against the underside of plug 114. Thereby, fluid flow adjacent a surface of plunger 22 is precluded. As is well known to those skilled in the art, O rings 116 and 122 can be readily replaced, as necessary, at minimum cost. Thus, upward flow adjacent plunger 22 into cavity 24 and upward flow intermediate plug 114 and its associated cone shaped section 112 is effectively precluded.

Presently used diaphragms 32 in diaphragm leak detectors 10 of the type illustrated are made of fabric impregnated with rubber. As a result of repeated flexing, both of these compounds will age rendering them progressively less flexible and progressively more susceptible to puncturing and cracking. To upgrade leak detector 10, it is preferable that the existing diaphragm be replaced with one made of impermeable inert flexible constant density man made materials. Such diaphragm will withstand higher pressures, more flex cycles and maintain constant response characteristics over a greater period of time.

In prior art leak detectors 10, the length of cylinder 44 of metering pin 40 must be positioned repetitively in a predetermined relationship with necked down channel 46 in poppet 12 at the base of plunger 22. Without repetitive accurate positioning between the necked down channel and the cylinder of the metering pin in combination with a predetermined tolerance of annular space therebetween, constancy of the flow rate while the leak detector is in the leak sensing position cannot be assured. The variability of position may result from wear, changing characteristics of the diaphragm and inadequate length of cylinder 44 with respect to necked down channel 46.

To provide greater assurance of repeatability of flow rate through the leak detector when it is in its leak sensing position, it is preferable that the metering needle have a cylinder 44 of greater length than preexisting cylinders. For this reason, element 52 is attached to cylindrical skirt 54. Upon installation of check valve 50, existing element 42 with its metering pin is removed. It is replaced by element 52 extending upwardly from the check valve and metering pin 40a having an extended length cylinder 44a (See FIG. 1B). Accordingly, the operability and repeatability of the leak detector can be substantially enhanced by employing element 52 and its metering pin.

A surge condition can occur while product is being dispensed from a system equipped with a mechanical leak detector which creates a different type of hydraulic hammer. This condition can occur when the total flow out the delivery line reduces the pressure downstream of the leak detector. This pressure reduction, when it falls below the reset pressure of the leak detector, will cause the poppet of the leak detector to return the leak detector to the leak sense mode. Upon such return, hydraulic hammer occurs. The leak detector will interpret the pressure wave attendant the hydraulic hammer as indicative of a no leak or tight line. Because the pressure of the pressure wave is above the leak sense pressure, the leak detector returns to the full flow mode. As long as the total flow out of the delivery line continues to allow the pressure to drop, this cycling of the leak detector will be repeated with great stress to the delivery system.

This surge tendency is reduced by using a lower than normal strength poppet return spring 36. The pressure required to hold the leak detector in the full flow mode is reduced and the likelihood of the leak detector returning to the leak sense mode is lessened. Additionally, the lower spring pressure produces a dampening effect during mode change between leak sense and full flow, which will further reduce any tendency to surge. Moreover, the lower spring pressure is not detrimental to operation of the leak detector if cone shaped seal 38 is used. The product filled space between the check valve and the leak detector provides a "cushion" or dampening effect further reducing the tendency to surge.

While the principles of the invention have now been made clear in an illustrative embodiment, there will be immediately obvious to those skilled in the art many modifications of structure, arrangement, proportions, elements, materials and components used in the practice of the invention which are particularly adapted for specific environments and operating requirements without departing from those principles.

I claim:

1. A check valve for protecting and for enhancing operation of a leak detector disposed downstream of a pump and having an outlet in fluid communication with a dispensing line of a retail gasoline or product dispensing system, said check valve comprising in combination:
   (a) a cylinder depending from the outlet of the leak detector for receiving product from the leak detector;
   (b) at least one aperture disposed in the wall of said cylinder for establishing fluid communication between the interior of said cylinder and the dispensing line;
   (c) a piston disposed within said cylinder, said piston being translatable to a first position for blocking flow through all of said at least one aperture and to a second position for accommodating flow from the leak detector into said cylinder and through said at least one aperture into the dispensing line as a function of the difference in pressure upstream and downstream of said piston; and
   (d) means for biasing said piston into the second position.

2. The check valve as set forth in claim 1 wherein said piston includes a settable relief valve for accommodating flow from the dispensing line into the leak detector.

3. The check valve as set forth in claim 1 wherein said at least one aperture includes a plurality of apertures annularly disposed within the wall of said cylinder.

4. The check valve as set forth in claim 3 wherein the total cross sectional area of said plurality of apertures is at least equal to the minimal cross sectional area of the dispensing line downstream of said check valve.

5. The check valve as set forth in claim 1 wherein said cylinder includes at the upstream end a threaded receiver from which said cylinder extends downstream, said threaded receiver including a threaded section for engaging the outlet of the leak detector.

6. The check valve as set forth in claim 5 wherein the leak detector includes a poppet and wherein said threaded receiver supports a metering pin for engaging and cooperating with the poppet.

7. The check valve as set forth in claim 1 wherein the leak detector includes a poppet, a housing defining a cavity, a diaphragm dividing the cavity into an upper and a lower chamber, a hollow plunger connected to the poppet for conveying product to the lower chamber from the poppet and extending into the lower chamber through a passageway to engage the diaphragm, and means for sealing the junction between the plunger and the passageway to ensure proper operation of the diaphragm actuated poppet and said pressure responsive piston, said sealing means comprising a hollow cone disposed about the plunger for engaging the passageway and precluding flow therebetween, a collar disposed about the plunger adjacent said cone for precluding flow intermediate the plunger and said cone and means for biasing said collar toward said cone.

8. The check valve as set forth in claim 7 including an O ring mounted on said cone for engaging the passageway.

9. The check valve as set forth in claim 7 including an O ring mounted about the plunger intermediate said collar and said cone.

10. A method for protecting a leak detector and a pump of a product dispensing delivery system from hydraulic hammer transmitted upstream from the delivery line without impeding dispensation of the product or normal operation of the leak detector, said method comprising in combination:
  (a) sensing a pressure differential between the pressure in the delivery line and the pressure at the outlet of the leak detector;
  (b) said step of sensing including the step of translating a piston in one direction in response to a greater pressure at the leak detector outlet and translating the piston in the other direction in response to a greater pressure in the delivery line;
  (c) permitting flow of the product into the delivery line upon translation of the piston in the one direction; and
  (d) urging translation of the piston in the other direction.

11. The method as set forth in claim 10 including the step of establishing a threshold pressure level within the leak detector by exercising said step of urging in the absence of a leak in the delivery line.

12. The method as set forth in claim 10 wherein said step of urging includes the step of compensating for thermal resiliency of the delivery line.

13. The method as set forth in claim 10 including the step of precluding the pressure waves attendant hydraulic hammer emanating from the delivery line from impinging upon the leak detector and the pump.

14. Apparatus for isolating a leak detector and a pump of a product dispensing system from the delivery line during periods of non dispensation of the product and for enhancing operation of the leak detector during dispensation of the product, said apparatus comprising in combination:
  (a) a cylinder having an inlet in fluid communication with and extending downstream of the leak detector for conveying the product from the leak detector to the delivery line, said cylinder including at least one aperture disposed in the side wall thereof in fluid communication with the delivery line;
  (b) a piston translatable within said cylinder for controlling the flow therethrough, said piston having a first position for precluding flow from the delivery line and through said inlet to the leak detector and a second position for accommodating fluid flow from said inlet through said at least one aperture and into the delivery line; and
  (f) means for biasing said piston into the first position and for establishing a threshold pressure differential between said inlet and the delivery line below which said piston inhibits flow from the leak detector into the delivery line.

15. The apparatus as set forth in claim 14 including a relief valve for accommodating flow into the leak detector when said piston is in the first position.

16. The apparatus as set forth in claim 14 wherein said at least one aperture includes a plurality of apertures having in totality a cross sectional area at least equivalent to the minimum cross sectional area of the delivery line.

17. The apparatus as set forth in claim 14 including means for securing said apparatus to the outlet of the leak detector.

18. The apparatus as set forth in claim 17 wherein said securing means comprises mating threaded sections.

* * * * *